United States Patent
Loesch (10) Patent No.: US 12,146,982 B2
(45) Date of Patent: Nov. 19, 2024

(54) METHOD FOR CALIBRATING A MIMO RADAR SENSOR FOR MOTOR VEHICLES

(71) Applicant: Robert Bosch GmbH, Stuttgart (DE)

(72) Inventor: Benedikt Loesch, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 831 days.

(21) Appl. No.: 17/043,866

(22) PCT Filed: Apr. 27, 2019

(86) PCT No.: PCT/EP2019/060831
§ 371 (c)(1),
(2) Date: Sep. 30, 2020

(87) PCT Pub. No.: WO2019/242913
PCT Pub. Date: Dec. 26, 2019

(65) Prior Publication Data
US 2021/0025972 A1   Jan. 28, 2021

(30) Foreign Application Priority Data
Jun. 21, 2018 (DE) .......................... 102018210070.5

(51) Int. Cl.
*G01S 7/40* (2006.01)
(52) U.S. Cl.
CPC .......... *G01S 7/4026* (2013.01); *G01S 7/4017* (2013.01); *G01S 7/403* (2021.05)
(58) Field of Classification Search
CPC ...... G01S 7/4026; G01S 7/4017; G01S 7/403; G01S 13/325; G01S 13/34;
(Continued)

(56) References Cited

U.S. PATENT DOCUMENTS

| 5,412,414 A * | 5/1995 | Ast | G01S 7/4017 |
| | | | 342/372 |
| 10,141,657 B2 * | 11/2018 | Kishigami | G01S 7/0234 |

(Continued)

FOREIGN PATENT DOCUMENTS

| CN | 105044693 A | 11/2015 |
| CN | 106461759 A | 2/2017 |

(Continued)

OTHER PUBLICATIONS

International Search Report for PCT/EP2019/060831, Issued Aug. 5, 2019.

*Primary Examiner* — Olumide Ajibade Akonai
*Assistant Examiner* — Yonghong Li
(74) *Attorney, Agent, or Firm* — NORTON ROSE FULBRIGHT US LLP; Gerard A. Messina (57) ABSTRACT

A method for the phase calibration of a MIMO radar sensor having an array of transmitting and receiving antenna elements that are offset from each other in at least one direction, and high-frequency modules, which are each assigned to a part of the array. The array is subdivided into transmitting subarrays and receiving subarrays in such a manner, that each subarray is assigned to exactly one of the high-frequency modules and at least two receiving subarrays, which belong to different high-frequency modules, are offset from each other in the at least one direction and are aligned with each other in the direction perpendicular to it. The method includes a calibration which corrects a receiving control vector with the aid of a known relationship between first and second comparison variables for the respective receiving subarrays.

12 Claims, 4 Drawing Sheets

(58) Field of Classification Search
CPC ............ G01S 13/4418; G01S 13/4454; G01S 13/931; G01S 7/0232; G01S 7/0234; G01S 7/0235; G01S 7/028; G01S 7/4008; G01S 7/4021; G01S 7/4034; G01S 2013/93275; H04B 17/21
See application file for complete search history.

(56) References Cited

U.S. PATENT DOCUMENTS

| | | | |
|---|---|---|---|
| 10,379,204 B2 * | 8/2019 | Loesch | G01S 13/931 |
| 10,613,197 B2 * | 4/2020 | Ito | G01S 7/4026 |
| 10,629,998 B2 * | 4/2020 | Lim | G01S 13/931 |
| 2006/0284768 A1 | 12/2006 | Pauplis | |
| 2012/0300682 A1 * | 11/2012 | Hartenstein | H01Q 5/40 |
| | | | 370/328 |
| 2015/0253419 A1 | 9/2015 | Alland | |
| 2016/0146931 A1 | 5/2016 | Rao et al. | |
| 2016/0209504 A1 | 7/2016 | Steinhauer et al. | |
| 2017/0045609 A1 | 2/2017 | Loesch | |

FOREIGN PATENT DOCUMENTS

| | | | |
|---|---|---|---|
| CN | 106796283 A | 5/2017 | |
| DE | 102013209708 A1 | 11/2014 | |
| DE | 102014208899 A1 | 11/2015 | |
| JP | 2003232852 A | 8/2003 | |
| JP | 2017058359 A | 3/2017 | |
| JP | 2017521683 A | 8/2017 | |
| JP | 2017534881 A | 11/2017 | |
| WO | 2004074866 A1 | 9/2004 | |

* cited by examiner

METHOD FOR CALIBRATING A MIMO RADAR SENSOR FOR MOTOR VEHICLES

FIELD

The present invention relates to a method for the phase calibration of a MIMO radar sensor having an array of a plurality of transmitting and receiving antenna elements, which are offset from each other in at least one direction, and having a plurality of high-frequency modules, which are each assigned to a part of the array.

BACKGROUND INFORMATION

In driver assistance systems for motor vehicles, for example, in systems for automatically regulating distance or in collision warning systems, radar sensors are often used for monitoring the traffic environment. Apart from the distance and the relative speed, the azimuth angle of the tracked objects is, generally, of significance as well, since, for example, during the tracking of vehicles traveling ahead, a traffic lane assignment is rendered possible with the aid of the azimuth angle. The elevation angle of the tracked objects may also be of significance, since it permits an assertion about the relevance of the target, for example, if the target may be driven over or driven under or constitutes an obstacle that is potentially a collision risk.

Azimuth and elevation angles of the targets may be ascertained from amplitudes and/or phase differences of transmitting and/or receiving antennae of the antenna array. In order to improve the accuracy and the selectivity of the angle estimate, radar sensors, which function according to the MIMO (multiple-input-multiple-output) principle, may be used. In this context, unlike in the case of classical SIMO (single-input-multiple-output) radar sensors, which operate, using one transmitting antenna and a plurality of receiving antennae, a plurality of transmitting antenna elements and a plurality of receiving antenna elements are used. In order to be able to separate the signals of the transmitting antenna elements at the receiving antenna elements, the transmitted signals must be uncorrelated (orthogonal). This may be achieved, using time-division multiplexing, frequency-division multiplexing, or code-division multiplexing.

In the angle estimation, the received signals are compared to an angle-dependent directional diagram measured beforehand. For the case in which only a single target is tracked (or a plurality of targets, which, however, may be clearly distinguished from each other in light of the distance and the relative speed), the estimated angle is yielded as a position of the greatest agreement between the received signal and the directional diagram. For the general case of multiple target estimation, conventional special estimation algorithms supply estimates of the tracking angles of all of the targets of concern.

Until now, it has been customary to measure the directional diagrams for each individual sensor at the factory, prior to the initial operation of the sensor. If the radar sensor is installed in a motor vehicle, for example, behind a bumper or behind a relief structure, such as an emblem of the motor vehicle make, distortions of the directional diagram may be generated, which cause systematic errors during the angle estimation. This is the case, in particular, for the transmitting directional diagram in MIMO radar sensors.

An alternative method, which also allows calibration or recalibration of a directional diagram of a MIMO radar sensor having $N_{tx}$ transmitting antenna elements and $N_{rx}$ receiving antenna elements, even after initial operation of the radar sensor, is described in German Patent Application No. DE 2014 208 899 A1.

This method includes the following steps:
prior to initial operation of the radar sensor:
storing a directional diagram, which assigns each of a plurality of angles θ a respective control vector $\underline{a}(\theta)$, which is made up of a transmitting control vector $\underline{a}_{tx}(\theta)$ and a receiving control vector $\underline{a}_{rx}(\theta)$;
after initial operation:
executing a radar measurement for tracking an object;
checking if the tracked object is a single target or a multiple target;
if it is a single target:
executing a SIMO measurement, using each of the transmitting antenna elements;
estimating the angle θ of the object in light of the measurement results;
calculating a first comparison variable for each transmitting antenna element, the first comparison variable being a function of the components of transmitting control vector $\underline{a}_{tx}(\theta)$;
calculating a second comparison variable for each transmitting antenna element, the second comparison variable being a function of the results of the SIMO measurements; and
correcting the transmitting control vector atx(θ) in light of a known relationship between the first and second comparison variables for each transmitting antenna element.

This method has the advantage that interference effects, which are first produced upon installation of the radar sensor in the vehicle and are therefore not yet able to be measured during the factory calibration, may be compensated for subsequently. For example, during the trip with the motor vehicle, in which the radar sensor is installed, if a single object is located at a particular azimuth angle θ, then, the transmitting directional diagram for this particular azimuth angle may be recalibrated with the aid of the method described above. Since, during operation of the motor vehicle, single objects are located at different azimuth angles θ in the course of time, a corrected (calibrated) transmitting directional diagram is gradually obtained for the entire azimuth angle range. The calibration phase may then be ended. However, as an option, it is also possible to continue the recalibration permanently or to repeat it at certain intervals, in order to take changes in the directional diagram related to ageing into account.

In the method described above, only the transmitting part of the directional diagram is calibrated. However, the above-mentioned German patent application also describes a method, which is executed in an analogous manner, and in which the receiving part of the directional diagram is calibrated with the aid of a plurality of MISO (multiple-input-single-output) measurements.

Recently, there has been increasing interest in radar sensors, which include two or more substantially identical high-frequency modules for generating the radar signals and for receiving and pre-evaluating the radar echoes. On one hand, these modules may be used individually in radar sensors having low power requirements, for example, in driver assistance systems, and on the other hand, a plurality of them may be interconnected, in order to provide a radar sensor having higher power output, in particular, having greater angular differentiation. However, in the last case, it is necessary to synchronize the different high-frequency modules precisely with each other, in order to prevent errors due to phase differences in the receiving parts and/or in the transmitting parts of the different high-frequency modules.

Conventional design approaches provide, e.g., for the use of a central oscillator or master/slave architectures, in each instance, in conjunction with an exact comparison of the signal paths. However, these design approaches are relatively complex.

In addition, in the case of radar sensors having a plurality of high-frequency modules, there is the problem that the high-frequency modules must necessarily be positioned at a certain spatial distance from each other, and therefore, they may interact in different ways with the respective installation environment and/or may have different temperatures, e.g., due to the heat generation in the radar sensor. Therefore, due to the temperature variation of the electronic components involved, temperature changes during operation of the radar sensor may result in phase differences, which affect the accuracy of the calibration. In the case of a one-time factory calibration of the radar sensor, these factors are scarcely foreseeable and, therefore, may only be controlled with difficulty.

SUMMARY

An object of the present invention is to provide a method, which allows the plurality of high-frequency modules of a radar sensor to be recalibrated "online," that is, during continuous operation of the radar sensor.

This object of the present invention may be achieved by the example features and example embodiments described herein.

In accordance with an example embodiment of the present invention, the array of transmitting and receiving antennae is subdivided into transmitting subarrays and receiving subarrays in such a manner, that each subarray is assigned to exactly one of the high-frequency modules and at least two receiving subarrays are offset from each other in one direction and aligned with each other in the direction perpendicular to that, and that the methods, described at the outset, for calibrating the directional diagram are then used on the level of the subarrays in an analogous manner; each subarray being treated as a single antenna element. In subarrays, which belong to different high-frequency modules, the phase shifts, which are caused by the asynchronism of the modules, are then also corrected automatically by the calibration.

Advantageous further refinements and embodiments of the present invention are described herein.

In accordance with an example embodiment of the present invention, the method may be used in both estimating an azimuth angle and estimating an elevation angle. If two or more subarrays, which belong to different high-frequency modules, are offset from each other in the horizontal direction, then the associated high-frequency modules may be calibrated with the aid of an angle estimation for the azimuth angle. However, if two or more subarrays, which belong to different high-frequency modules, are offset from each other vertically, then the corresponding high-frequency modules may be calibrated with the aid of an elevation angle estimate.

The present invention also includes a radar sensor for motor vehicles, in which one of the methods described above is implemented.

Below, an exemplary embodiment is explained in further detail with the aid of the figures.

DETAILED DESCRIPTION OF EXAMPLE EMBODIMENTS

Figure 1:
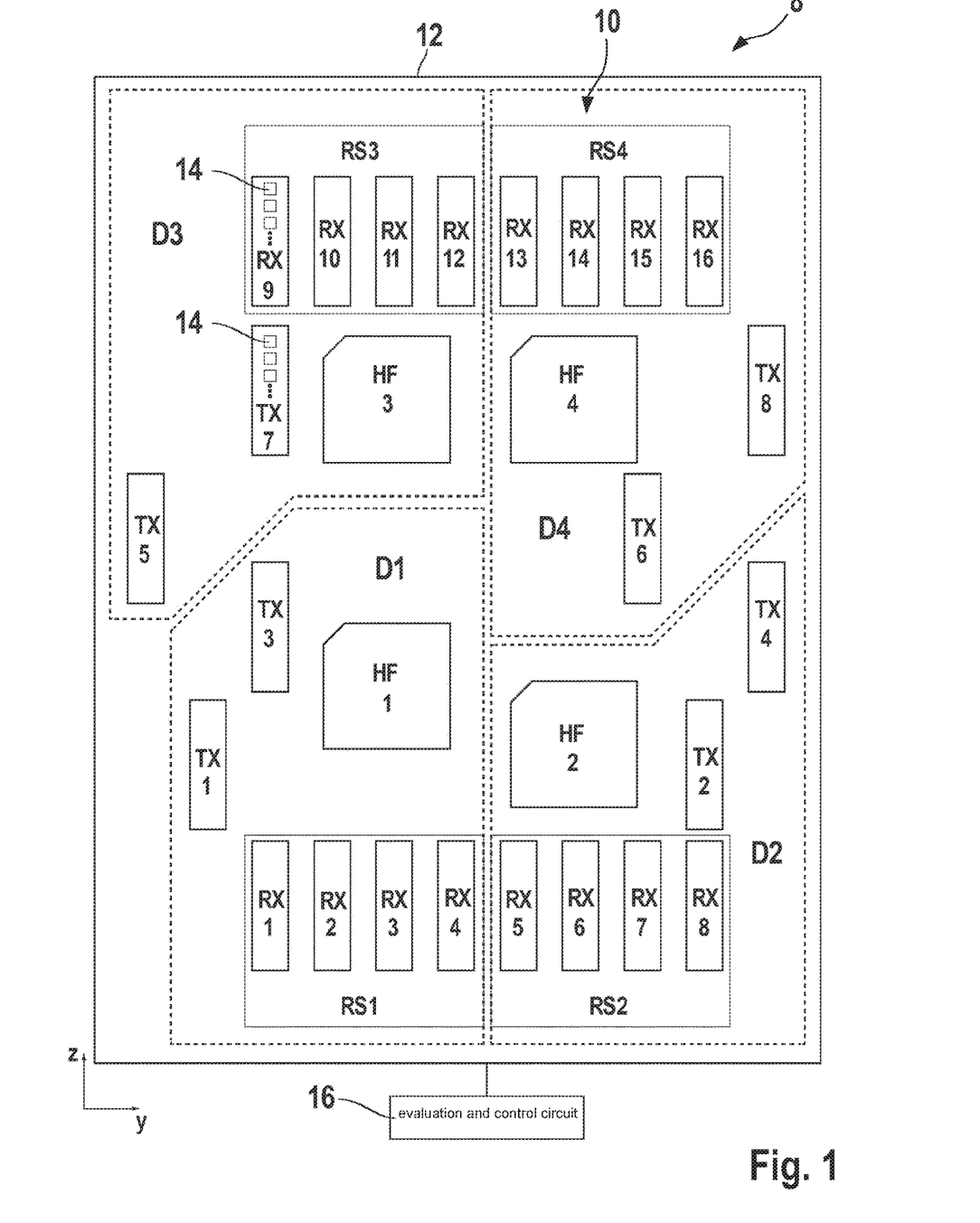
FIG. 1 shows a block diagram of a radar sensor, in which the present invention may be used.

The radar sensor 8 shown in FIG. 1 includes an array 10 of transmitting and receiving antennae, as well as four identical high-frequency modules HF1-HF4, which are situated on a common board 12. The transmitting and receiving antennae are formed by antenna elements 14 (patches), which are positioned in vertical columns.

In the example shown, array 10 is divided up into four domains D1-D4, which are each assigned one of high-frequency modules HF1-HF4. Each high-frequency module provides a transmitted signal for the transmitting antennae of its domain and includes, as is conventional and is therefore not shown here, a number of mixers, in which, in each instance, the signals received by a receiving antenna are mixed with a portion of the transmitted signal and thus converted down into an intermediate frequency band, which means that they are then digitized and processed further in an evaluating and control circuit 16 (in this case, outside of board 12).

Each of domains D1-D4 contains a number of subarrays of transmitting and receiving antennae. In the example shown, domain D1 includes two transmitting subarrays TX1, TX3 and a receiving subarray RS1, domain D2 includes two transmitting subarrays TX2, TX4 and a receiving subarray RS2, domain D3 includes two transmitting subarrays TX5, TX7 and a receiving subarray RS3, and domain D4 includes two transmitting subarrays TX6, TX8 and a receiving subarray RS4. In the example shown, each of transmitting subarrays TX1-TX8 is made up of one column or a plurality of parallel columns of antenna elements 14 running vertically (in the z-direction). On the other hand, each of receiving subarrays RS1-RS4 is made up of four parallel columns or sub-subarrays RX1-RX4, RX5-RX8, RX9-RX12 and RX13-RX16, respectively, which are positioned in two parallel rows running horizontally (in the y-direction) and are spaced uniformly with respect to each other within each row.

Transmitting subarrays TX1-TX8 form four pairs, which are offset from each other, and with respect to receiving subarrays RS1-RS4, in the z-direction. In this context, the transmitting subarrays of each pair are at the same elevation in the z-direction and are at a distance from each other in the y-direction, which is greater than the widths of transmitting subarrays RS1, RS2 (and RS3, RS4) together (in the y-direction).

The multicolumn transmitting subarrays allow a high-resolution estimate of the azimuth angle. In this context, according to the MIMO principle, measurements may be taken, using different combinations of transmitting and receiving subarrays, for example, by alternately transmitting, using transmitting subarrays TX1 and TX2, and evaluating the received signals of all eight antenna columns of receiving subarrays RS1 and RS2. Since the phase relationships between the received signals are a function of the relative position of the transmitting and receiving subarrays in the y-direction, in this manner, a virtual array is obtained, which is more than twice as wide as the two receiving subarrays RS1 and RS2 together.

According to the same principle, the offset of the transmitting and receiving subarrays in the z-direction also allows an estimate of the elevation angle.

However, a requirement for successful angle estimates is that the directional diagrams, which specify the phase relationships between the received signals as a function of the tracking angle of the object, are correctly calibrated.

However, in the radar sensor shown here, the complication arises that, for example, the subarrays in domains D1 and D2 are powered by two different high-frequency modules HF1 and HF2, which means that the correct calibration of the directional diagram is also a function of a possible phase offset between the transmitted signals of the two high-frequency modules HF1 and HF2. Since this phase offset may change during operation of the radar sensor, for example, due to temperature fluctuations in the high-frequency modules, a one-time calibration of the radar sensor at the factory is not sufficient.

Therefore, the present invention described herein provides a method which allows the directional diagrams to be recalibrated in such a manner during operation of the radar sensor, that the phase offsets between the different high-frequency modules HF1-HF4 may also be taken into account correctly.

Figure 2:
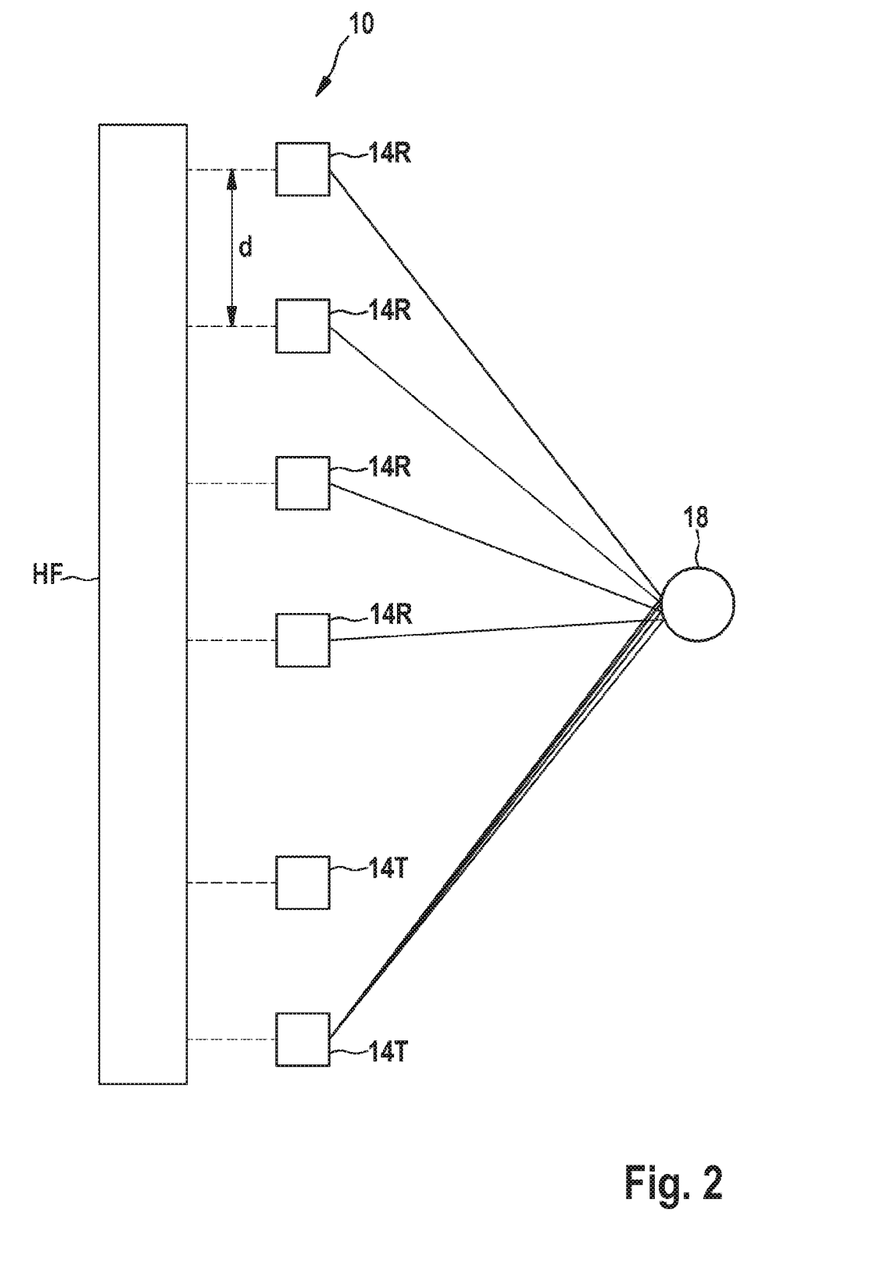
FIG. 2 shows a diagram of a MIMO radar sensor having two transmitting antenna elements and four receiving antenna elements.

However, for easier understanding, the calibration method will initially be explained for a highly simplified antenna array, which is shown in FIG. 2.

In this example, the antenna array has only two transmitting antenna elements 14T and four receiving antenna elements 14R. Transmitting antenna elements 14T are powered by a high-frequency module HF having a connected control and evaluation unit, and emit radar signals, which are reflected by an object 18 and are received by each of the receiving antenna elements 14R. The received signals are evaluated separately in the control and evaluation unit.

Simply for the sake of clarity, in this case (as also in FIG. 1), a bistatic antenna system has been shown, in which transmitting antenna elements 14T are different from receiving antenna elements 14R. In practice, a monostatic antenna design may also be used, in which the same antenna elements are utilized for transmitting and for receiving.

In this example, receiving antenna elements 14R are positioned in a straight line at a uniform spacing (ULA; uniform linear array). The same also applies to transmitting antenna elements 14T; the transmitting and receiving antenna elements not necessarily having to be positioned on the same straight line.

In the example shown, the radar sensor is operated, using a time-division multiplexing method. That is, at any time, only one of the $N_{tx}$ (=2) transmitting antenna elements 14T is active. The activity phases of the individual antenna elements alternate with each other cyclically. In FIG. 2, the case, in which only the lower of the two transmitting antenna elements 14T is active, is represented symbolically.

Alternatively, the radar sensor could also be operated, using a frequency-division multiplexing method. All of the transmitting antenna elements 14T would then be active simultaneously but would operate at slightly different frequencies, so that the signals of the different transmitting antenna elements may be separated again on the receiving side.

A further option would be the code-division multiplexing method. In this instance, a particular code is modulated upon the signal transmitted by each of transmitting antenna elements 14T, and on the receiving side, the signals are separated from each other by code-selective filtering.

Figure 3:
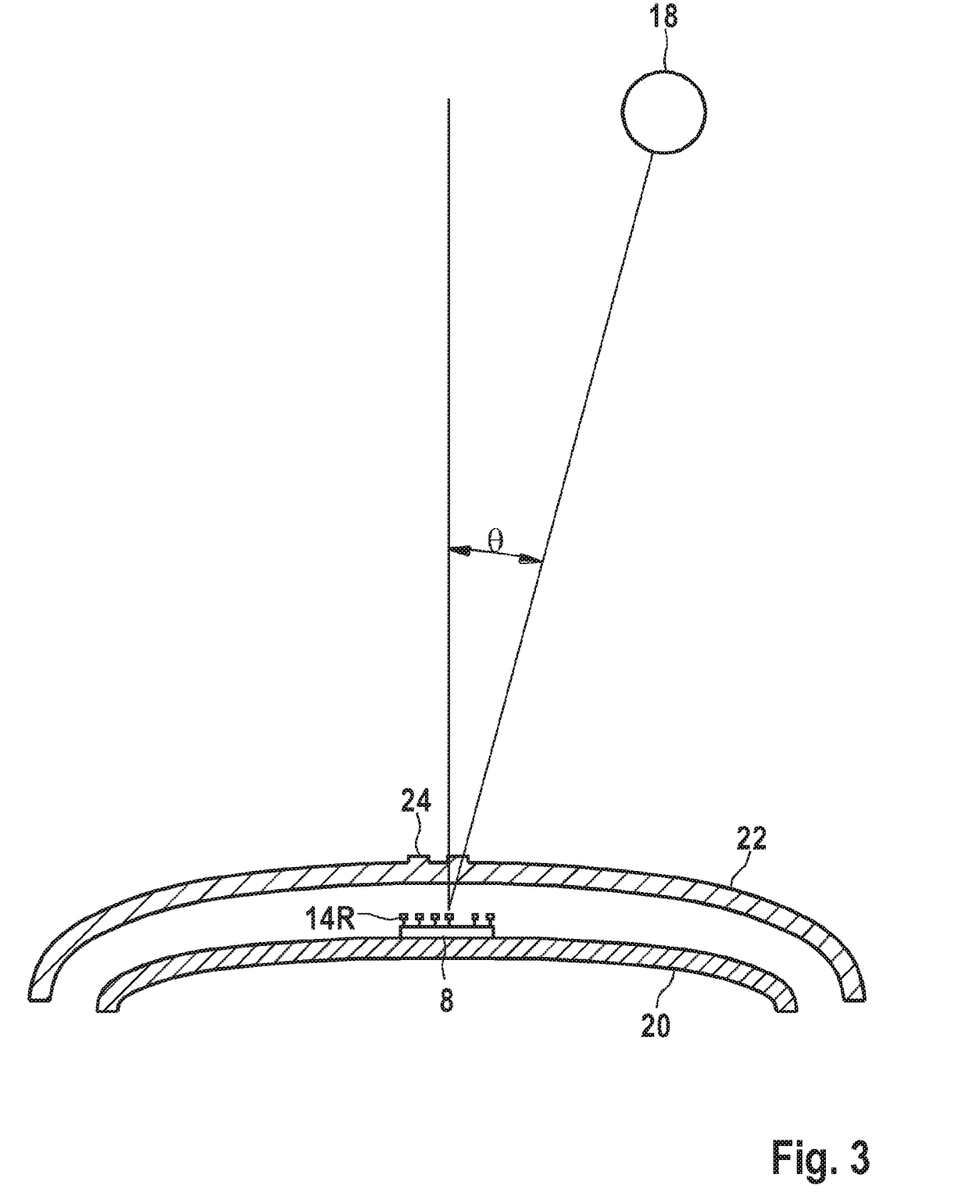
FIG. 3 shows a diagram of the radar sensor according to FIG. 2, after installation in a motor vehicle, and during the tracking of an object.

In the following, the time-division multiplexing method is discussed for purposes of clarification. In a simple signal model, it may be assumed that object 18 is a point-shaped scattering center, by which the signal emitted by active transmitting antenna element 14T is scattered in the form of a spherical wave that then reaches the different receiving antenna elements 14R. In FIG. 1, however, the distance between the radar sensor and object 18 is unrealistically short. In practice, this distance is so large, that the dimensions of radar sensor 8 are negligibly small in comparison with the distance of the object. FIG. 3 shows somewhat more realistic proportions, where object 18 is at a greater distance in front of the front end of a motor vehicle 20, to which radar sensor 8 is mounted. The radar waves entering at the location of the radar sensor may then be effectively approximated as plane waves, which arrive at all of the receiving antenna elements 14R at practically the same angle of incidence, the (azimuth) angle $\theta$ of object 18.

The four-component vector shall be denoted by $\underline{x_n}$; the components $(x_{n,1}, x_{n,2}, x_{n,3}, x_{n,4})$ of the four-component vector indicating the complex amplitudes of the signals, which are transmitted by nth transmitting antenna element 14T and are received by the four receiving antenna elements 14R. If d is the distance from antenna element to antenna element, $\lambda$ is the wavelength of the radar radiation and $s=x_{n,1}$ is the (time-dependent) complex amplitude of the signal, which is received by the first of the receiving antenna elements 14R (for example, the antenna element situated furthest to the right in FIG. 3), then the following equation applies due to the differences between the signals, which arrive at the different receiving antenna elements 14R, the difference being in regard to the distance traveled:

$$\underline{x_n}(\theta) = s(1, e^{-2\pi i(d/\lambda)\sin\theta}, e^{-2\pi i(2d/\lambda)\sin\theta}, e^{-2\pi i(3d/\lambda)\sin\theta})^T = s\,\underline{a}_{rx}(\theta) \qquad (1)$$

The superscripted symbol "T" is intended to refer to the transpose, since the vectors here are written as line vectors but should be regarded as column vectors. Vector $\underline{a}_{rx}$ is referred to as a receiving control vector. This control vector specifies the geometric characteristics and wave propagation characteristics of each receiving antenna array considered. Such a control vector may be determined not only for ULA antenna arrays, but generally for other antenna configurations, as well.

Accordingly, a control vector $\underline{a}_{tx}$ may also be determined for the array of (in this example, only two) antenna elements 14T; in this example, the control vector would essentially be specifying the differences in the optical paths traveled from the transmitting antenna elements to object 18.

The following control vector is obtained for the entire MIMO antenna array:

$$\underline{a}(\theta) = \underline{a}_{tx}(\theta) * \underline{a}_{rx}(\theta) \qquad (2)$$

Here, the symbol * denotes the Kronecker product. Thus, in the exemplified case considered here, the following applies:

$$\underline{a}(\theta) = (a_{tx,1}a_{rx,1}, a_{tx,1}a_{rx,2}, a_{tx,1}a_{rx,3}, a_{tx,1}a_{rx,4}, a_{tx,2}a_{rx,1}, a_{tx,2}a_{rx,2}, a_{tx,2}a_{rx,3}, a_{tx,2}a_{rx,4})^T \qquad (3)$$

The received signals form a vector $\underline{x}$ having $N_{tx} \cdot N_{rx}$ components (in this example, 8 components), and the following applies:

$$\underline{x}(\theta) = s\,\underline{a}(\theta) \qquad (4)$$

Knowledge of control vector $\underline{a}(\theta)$ allows a relationship, which is one-to-one under suitable conditions, to be established between angle θ of the object and the received signals $\underline{x}$, and the azimuth angle θ of the object to be deduced from the amplitude relationships and phase relationships of the received signals. However, since, in practice, the received signals will be more or less noisy, the azimuth angle may not be calculated exactly, but only estimated, for example, with the aid of a maximum likelihood estimation.

If this principle is generalized to multitarget estimations, then the individual angle θ becomes a vector $\underline{\theta}$, whose components indicate the angles of the different targets, the control vector $\underline{a}$ becomes a control matrix A, and the following equation applies $$\underline{x} = A\underline{\theta} \qquad (5)$$

In principle, the directional diagram, that is, the totality of all control vectors $\underline{a}(\theta)$ for all possible azimuth angles θ, may be measured for a given radar sensor prior to initial operation of the sensor. However, in the example shown in FIG. 3, radar sensor 10 is installed behind a bumper 22 of the motor vehicle, and this bumper 22 additionally includes still one spot of relief 24, for example, because an emblem of the motor vehicle make is imprinted or stamped out. Since the optical density of the bumper is different from the optical density of the air, refraction of the radar waves on and in bumper 22 produces differences in distance traveled, which have an influence on the directional diagram. This influence is a function of the exact mounting location of the radar sensor relative to relief 24 and, therefore, may only be compensated for computationally with difficulty, particularly since effects, such as soiling of the bumper, may also distort the directional diagram further. Of course, these problems increase even more, when the antenna array has larger dimensions, such as in FIG. 1.

Now, the objective is to recalibrate the directional diagram in such a manner, after the installation of the radar sensor in the vehicle, that such distortions of the directional diagram do not result in significant errors in the estimation of the angle.

First of all, an option for recalibrating transmitting control vector $\underline{a}_{tx}(\theta)$ shall be described. In this context, it is useful to define relative control vectors $\underline{a}'_{tx}(\theta)$ and $\underline{a}'_{rx}(\theta)$:

$$\underline{a}'_{tx}(\theta) := \underline{a}_{tx}(\theta)/a_{tx,1}(\theta) \qquad (6)$$

and $$\underline{a}'_{rx}(\theta) := a_{tx,1}(\theta)\underline{a}_{rx}(\theta) \qquad (7)$$

Due to equation (2), $$\underline{a}(\theta) = \underline{a}'_{tx}(\theta) * \underline{a}'_{rx}(\theta) \qquad (8)$$

since the factor $\underline{a}'_{tx}(\theta)$ cancels out. Therefore, recalibration of relative transmitting control vector $\underline{a}'_{tx}(\theta)$ is equivalent to recalibration of original transmitting control vector $\underline{a}_{tx}(\theta)$.

The quality of an angle estimate is described by the so-called quality function $q(\underline{\theta})$. This function is a measure of the probability that the estimates ascertained by the estimation algorithm correspond to the actual angular positions of the tracked objects. For the general case of a multitarget estimation, in which a plurality of targets that are not distinguishable in light of their distances and relative speeds are located at different angles $\theta_j$, the quality function is given by the equation $$q^2(\underline{\theta}) \leq \underline{x}^H P_A(\underline{\theta})\underline{x} \qquad (9)$$

In this, $\underline{x}$ is the vector of the signals obtained, using the different combinations of transmitting and receiving antenna elements, $\underline{x}^H$ is the Hermitially conjugated vector for $\underline{x}$, and $P_A(\underline{\theta}) = A(A^H A)^{-1} A^H$, where A is the control matrix, which contains the control vectors of all targets. It is also possible for the control matrix to include a plurality of control vectors for the same target, if, due to reflections by guardrails or the like, a plurality of optical paths lead from the same target to the radar sensor.

In the case of a single target having only one path, this equation simplifies to $$q^2(\theta) = |\underline{a}^H(\theta)\underline{x}|^2/(|\underline{a}(\theta)|^2|\underline{x}|^2) \qquad (10)$$

The control vector $\underline{a}(\theta)$ may be measured and normalized prior to initial operation of the radar sensor. In each instance, signal vector $\underline{x}$ may also be normalized after an occurring measurement. Therefore, in the following, it should be assumed that both the control vector and the signal vector are normalized, thereby simplifying the equation further to:

$$q^2(\theta) = |\underline{a}^H(\theta)\underline{x}|^2 \qquad (11)$$

Vector $\underline{x}$ may be described as $$\underline{x} = \{\underline{xi}\}, i = 1 \ldots N_{tx} \qquad (12)$$

In this, $\underline{xi}$ are the vectors, which specify the measuring signals that have been transmitted by the ith transmitting antenna element and received by the $N_{rx}$ receiving antenna elements. For a (single-target) MIMO angle estimate, using all of transmitting antenna elements 14T, the following quality function is obtained:

$$q^2(\theta) = |\underline{a}^H(\theta)\underline{x}|^2 = |\Sigma_i a_{tx,i}^*(\theta)\underline{a}_{rx}^H(\theta)\underline{xi}|^2 \qquad (13)$$

In this, the sum is taken over all $N_{tx}$ transmitting antenna elements (summation index i), and $a_{tx,i}^*(\theta)$ is the complex conjugate of the individual component $a_{tx,i}(\theta)$ of transmitting control vector $\underline{a}_{tx}(\theta)$. The final transformation in equation (13) follows from equation (2).

If variables $\gamma_i(\theta)$ are now defined as:

$$y_i(\theta) = \underline{a}_{rx}^H(\theta)\underline{xi} \qquad (14)$$

then the following is obtained from equation (13):

$$q^2(\theta) = |\Sigma a_{tx,i}^*(\theta) y_i(\theta)|^2 \qquad (15)$$

In a single-target SIMO angle estimation, which is carried out, using only the ith transmitting antenna element, the following is obtained (with normalization):

$$q^2 = |y_i(\theta)|^2/|\underline{xi}|^2. \qquad (16)$$

With the aid of this angular quality, it may now be decided if, in the case of the angle estimate, a single-target situation or a multitarget situation is present. In the multitarget situation, the quality function will have a markedly lower value. Therefore, in the case of estimated angle θ, the criterion, that the quality function lies below a suitably chosen threshold value, may be used for the decision.

However, other methods and criteria may optionally be utilized, as well, in order to distinguish between a single-target situation and a multitarget situation.

If the signal noise is disregarded, then the following is an approximation for the true angle θ:

$$\underline{xi} = s\, a_{tx,i}(\theta)\underline{a}_{rx}(\theta) \qquad (17)$$

where s represents the complex amplitude of the signal emitted by the target and θ is the actual angle of the target.

If equation (17) is substituted into equation (14), then the following is obtained:

$$y_i(\theta) = \underline{a}_{rx}^H(\theta) s\, a_{tx,i}(\theta)\underline{a}_{rx}(\theta) \qquad (18)$$

Since $\underline{a}_{rx}(\theta)$ is normalized, this simplifies to $$y_i(\theta) = s\, a_{tx,i}(\theta) \qquad (19)$$

If SIMO measurements are now taken one after the other, using each of transmitting antenna elements 14T, $N_{tx}$ relationships of the type indicated in equation (19) are obtained. However, since amplitude s is not known, it may not yet be immediately checked if, and how accurately, these equations (19) are satisfied. But, this problem may be circumvented by dividing each of the vectors on the left and right sides of equation (19) by a single one of their components (without limiting the generality due to first component $a_{tx,1}(\theta)$ and/or $y_1(\theta)$). The following is then obtained:

$$a_{tx,n}(\theta)/a_{tx,1}(\theta)=y_n(\theta)/y_1(\theta) \quad (20)$$

The variables on the left side of equation (20) are the components of the relative transmitting control vector $a_{tx}'(\theta)$. In accordance with equation (14), the variables on the right side are obtained from the measuring results $\underline{xi}$ and the known receiving control vector $\underline{a}_{rx}(\theta)$ originally used.

Thus, recalibration is easily possible by replacing the relative transmitting control vector $\underline{a}_{tx}(\theta)$ previously used with the vector including the components $y_n(\theta)/y_1\theta$). With the aid of the difference between the old and the new relative transmitting control vectors, how markedly the previously utilized directional diagram has been distorted, may be determined in an equally simple manner.

In the procedure described above, a coherent summation $(y_i(\theta)=\underline{a}^H_{rx}(\theta)\underline{xi})$ must be executed initially, and subsequently, the ratio $y_n(\theta)/y_1(\theta)$ must be calculated. In general, however, only a tolerably small error is generated, if the calculation is simplified by initially computing the ratios $x_{n,k}/x_{11,k}$ and subsequently averaging them over all k (that is, over all receiving antenna elements). Thus, the following relationships may also be used in place of equation (20), as an approximation:

$$a_{tx,n}(\theta)/a_{tx,1}(\theta)=(1/N_{rx})\Sigma_k(x_{n,k}/x_{1,k}) \quad (21)$$

In this, $x_{n,k}=(\underline{xn})_k=x_j$, where $j=(k-1)N_{rx}+n$, the nth component of the partial vector $\underline{xn}$ of $\underline{x}$.

Therefore, the example method of the present invention includes the following steps:
- calculating a first comparison variable (e.g., $a_{tx,n}(\theta)/a_{tx,1}(\theta)$) for each transmitting antenna element (having the index n), the first comparison variable being a function of the components of transmitting control vector $\underline{a}_{tx}(\theta)$;
- calculating a second comparison variable (e.g., $y_n(\theta)/y_1(\theta)$ or $\Sigma_k(x_{n,k}/x_{1,k})$) for each transmitting antenna element, the second comparison variable being a function of the results of the SIMO measurements; and
- correcting transmitting control vector $\underline{a}_{tx}(\theta)$ (or equivalent to that, the relative transmitting control vector $\underline{a}'_{tx}(\theta)$) in light of a known relation (equation (20) or (21)) between the first and second comparison variables for each transmitting antenna element.

An analogous method also allows the receiving directional diagram, that is, receiving control vector $\underline{a}_{rx}$, to be calibrated or recalibrated.

In this context, the following takes the place of equation (13):

$$q^2(\theta)=|\Sigma_i a_{tx,i}*(\theta)\underline{a}_{rx}^H(\theta)\underline{xi}|^2=|\underline{a}_{rx}^H(\theta)\underline{x}'(\theta)|^2 \quad (22)$$

where $$\underline{x}'(\theta)=\Sigma_i a_{tx,i}*(\theta)\underline{xi} \quad (23)$$

and analogously to equation (12):

$$\underline{x}'=\{\underline{xn}'\}, n=1 \ldots N_{rx} \quad (23)$$

In the case of a single-target MISO (multiple-input-single-output) angle estimate, which is executed only with the aid of the nth receiving antenna element, the following is obtained (with normalization):

$$q^2=|\underline{xn}'|^2/(\Sigma_i|\underline{xn}'_i|^2)^{-1/2} \quad (24)$$

Again, in light of the angular quality, it may be decided if, in the case of the angle estimate, a single-target situation or a multitarget situation is present.

If a single-target situation is present and the signal noise is disregarded, then the following is an approximation for true angle $\theta$:

$$\underline{xi}=s\, a_{tx,i}(\theta)\underline{a}_{rx}(\theta) \quad (25)$$

A computation analogous to equations (18) through (20) then results in:

$$a_{rx,n}(\theta)/a_{rx,1}(\theta)=x'_n(\theta)/x'_1(\theta) \quad (26)$$

Thus, in this case, the first comparison variables are the components $a_{rx,n}(\theta)a_{rx,1}(\theta)$ of a relative receiving control vector $\underline{a}''_{rx}$ (defined in a manner analogous to equation (6)). The second comparison variables, which are now a function of the results of the MISO measurements, are formed by the variables $x'_n(\theta)/x'_1(\theta)$ for each receiving antenna element (index n).

In this case, as well, the comparison variables and relationships may be used as a good approximation in a manner analogous to equation (21):

$$a_{rx,n}(\theta)/a_{rx,1}(\theta)=(1/N_{tx})\Sigma_k(x_{k,n}/x_{k,1}) \quad (27)$$

The calibration procedures described above may also be executed in an analogous manner for the radar sensor 8 shown in FIG. 1. In this context, the calibration of the subarrays within a domain corresponds exactly to the methods described above; the transmitting subarrays, for example, TX1 and TX3, taking the place of transmitting antenna elements 14T; whereas in the meantime, in the receiving antennae, the sub-subarrays, for example, RX1-RX4, taking the place of receiving antenna elements 14R.

However, in the same way, calibration procedures, in which the boundaries between the domains are crossed, are also possible. For example, the directional diagram for the two receiving subarrays RS1 and RS2 may also be calibrated. The receiving control vector then includes eight components, four for each of the two subarrays. The MISO measurements are then carried out for each of the eight sub-subarrays RX1, RX8, for example, in each instance, using the four transmitting subarrays TX1-TX4. The measurements, using antenna combinations TX1, RX1-RX4 and TX3, RX1-RX4, yield a calibration for the sub-subarrays within domain D1. The measurements, using antenna combinations TX2, RX1-RX4 and TX4, RX1-RX4, yield a calibration for the same sub-subarrays, but these two calibrations will not generally agree, since in the measurements using TX2 and TX4, a phase offset between high-frequency modules HF1 and HF2 may also become noticeable. The same is true for the two possible calibrations of sub-subarrays RX5-RX8 in domain D2. In general, the phase offset between the two high-frequency modules may result in the corrected receiving control vectors' rejecting each other either in the first four components or in the last four components, depending on the domain in which the utilized transmitting subarray is situated. This deviation may now be used for determining the phase offset between high-frequency modules HF1 and HF2 and, on this basis, for undertaking a phase calibration of the two high-frequency modules.

The same applies analogously to domains D3 and D4 and the calibration of high-frequency modules HF3 and HF4. In the same way, the high-frequency modules may also be calibrated in the course of recalibration of the transmitting control sectors, with the aid of SIMO measurements.

By recalibrating the directional diagrams for elevation angle (φ), the phase offset between high-frequency modules HF1 and HF3 and the phase offset between high-frequency modules HF2 and HF4 may also be determined in a corresponding manner, which means that in the end, phase calibration for all four high-frequency modules is achieved.

Figure 4:
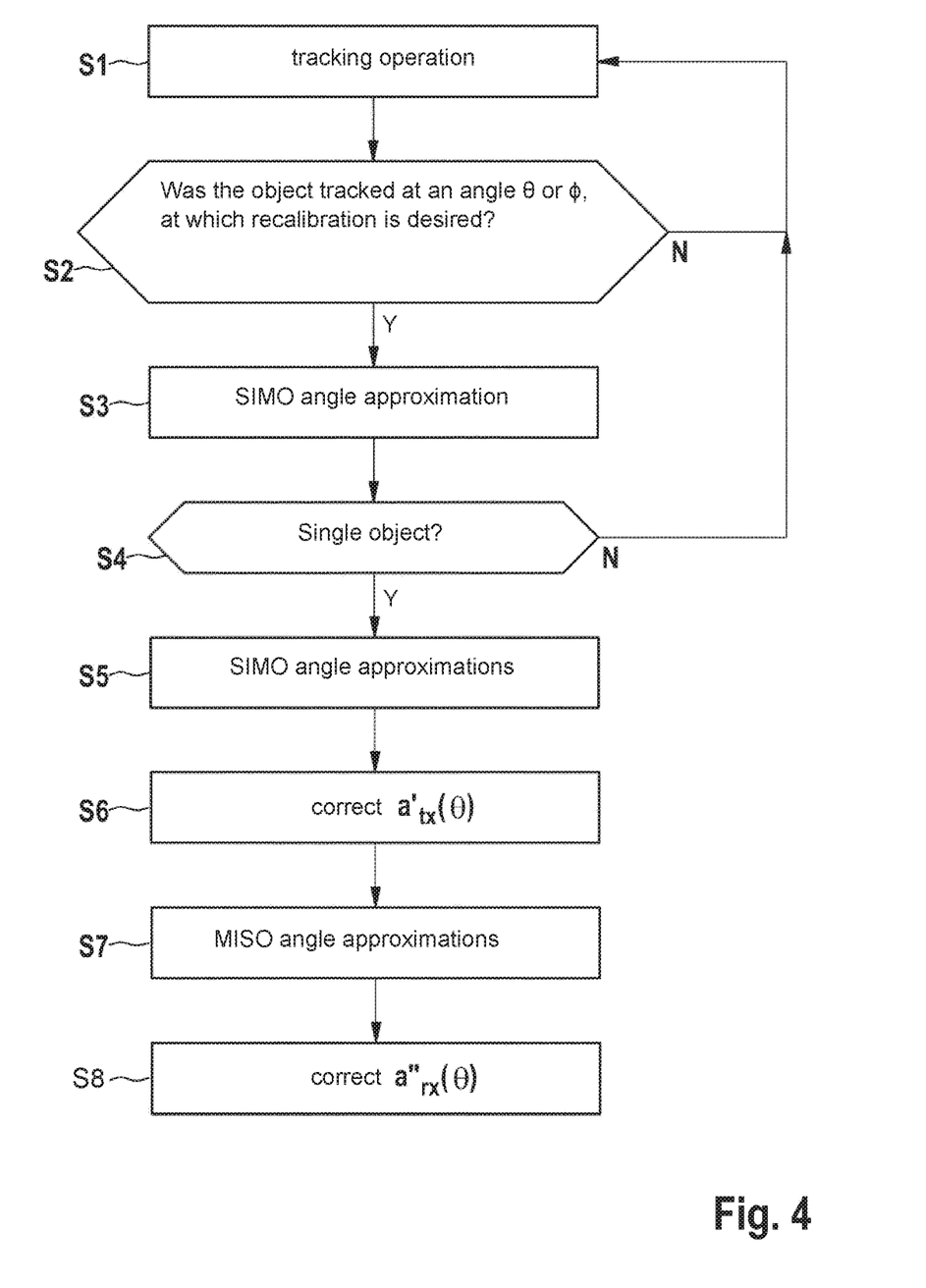
FIG. 4 shows a flow chart of an example embodiment of a method for calibrating the radar sensor according to FIG. 1, in accordance with the present invention.

A complete calibration procedure, which may be executed during a trip with the motor vehicle that includes radar sensor 8, is shown in FIG. 4.

In step S1, the normal tracking operation is initially carried out, that is, objects in the surroundings of the vehicle are tracked with the aid of radar sensor 8. In this context, multitarget (azimuth and elevation) angle estimates are made for the tracked objects on the basis of the directional diagrams, which were measured originally during the initial operation of the radar sensor or were recalibrated in previous recalibration procedures.

In step S2, it is checked if, in the current tracking cycle, an object was located at an azimuth angle θ and/or at an elevation angle φ, for which recalibration has still not taken place or the last recalibration is already a certain time ago.

If that is the case (Y), then, in step S3, a SIMO measurement and angle estimation for the azimuth or elevation angle is carried out, using one of transmitting subarrays TX1-TX4. Otherwise (N), the method returns to step S1, and the loop including steps S1 and S2 is run through, until an object is found at an angle, for which recalibration is intended to take place.

With the aid of the angular quality in the SIMO angle estimate made in step S3, in step S4, it is decided whether or not the object tracked at angle θ and/or φ is a single object.

If it is not a single object (N), the method returns again to the loop including steps S1 and S2. If it is a single object (Y), then, in step S5, further SIMO measurements are taken, using all of the transmitting subarrays TX1-TX4. In this manner, one obtains a complete set of variables $y_i(\theta)$ for all of the transmitting subarrays. In light of the comparison variables calculated from this, then, in step S6, the (relative) transmitting control sector $a'_{tx}(\theta)$ is corrected (recalibrated).

Optionally, another step S7 may follow, in which MISO measurements are carried out for the same object, using all of the sub-subarrays of receiving subarrays RX1-RX16. Then, in step S8, the (relative) receiving control vector $a''_{rx}(\theta)$ is also corrected on the basis of these measurements.

If the time-division multiplexing method is used, then the intervals between the individual SIMO measurements and/or MISO measurements should not be overly large, in order that errors, which are generated by possible location shifts of the object in the time elapsing between the measurements, do not result in a significant error. However, it is possible to temporally nest the measurements in such a manner and/or to combine the measuring results in such a manner, that the errors caused by the temporal offset average out. An example of such a method is described in German Patent Application No. DE 10 2013 209 708 A1.

There is also an analogous refinement in the case of the frequency-division multiplexing method, since here, the distance of the target, in conjunction with the frequency shift between the transmitting antenna elements, may result in a phase difference between variables $y_i(\theta)$, which, in some instances, must be compensated for.

What is claimed is:

1. A method for phase calibrating a multiple-input-multiple-output (MIMO) radar sensor for a motor vehicle, the method comprising:

at least one calibration routine, including the following steps:

prior to initial operation of the MIMO radar sensor, wherein the MIMO radar sensor includes an array having a plurality of antenna domains, each of the plurality of the antenna domains having subarrays of transmitting antennae, made from transmitting antenna elements, and receiving antennae, made from receiving antenna elements, which are offset from each other in at least one direction, and a plurality of high-frequency modules, each of which is assigned to one of the plurality of the antenna domains of the array, wherein the subarrays include transmitting subarrays and receiving subarrays, wherein one of the transmitting subarrays and one of the receiving subarrays is assigned to exactly one of the high-frequency modules, and wherein at least two of the receiving subarrays, which are assigned to different ones of the high-frequency modules, are offset from each other in the at least one direction and are aligned with each other in a direction perpendicular to the at least one direction, performing the following:

storing a directional diagram, which assigns each of a plurality of angles a respective control vector, which includes a transmitting control vector and a receiving control vector, the transmitting control vector and the receiving control vector each including at least one component for each of the transmitting subarrays and receiving subarrays, respectively;

after initial operation, performing a sub-method by performing the following:

executing a radar measurement for tracking an object;

checking whether the tracked object is a single target or multiple targets; and when the tracked object is a single target, performing the following:

carrying out a multiple-input-single-output (MISO) measurement, using each of the at least two receiving subarrays;

estimating an angle of the tracked object using MISO measurement results;

computing a first comparison variable for each of the at least two receiving subarrays, the first comparison variable being a function of the at least one component of the receiving control vector;

computing a second comparison variable for each of the at least two receiving subarrays, the second comparison variable being a function of results of the MISO measurements; and correcting the receiving control vector using a known relationship between the first comparison variable and the second comparison variable for the respective receiving subarrays;

wherein the plurality of the antenna domains are situated on a circuit board, wherein each of the plurality of the antenna domains, which is situated on the circuit board, includes one of the high-frequency modules, one of the transmitting subarrays, and one of the receiving subarrays, and wherein the sub-method provides that interference effects, which are produced upon installation of the radar sensor in the motor vehicle and which are not measurable during a factory calibration, are subsequently compensatable.

2. The method as recited in claim 1, wherein the MIMO radar sensor includes at least three high-frequency modules, wherein the array is subdivided into the transmitting subarrays and the receiving subarrays so that at least two of the transmitting subarrays and receiving subarrays, which are assigned to a first one of the high-frequency modules and a second one of the high-frequency modules, respectively, are positioned so as to be horizontally offset from each other, and at least one further one of the transmitting subarrays and receiving subarrays, which is assigned to a third one of the high-frequency modules, is positioned so as to be vertically offset from the at least two of the transmitting subarrays and receiving subarrays, and wherein, for a phase calibration of the first one of the high-frequency modules and the second one of the high-frequency modules, an azimuth angle estimation is made, and a phase calibration of the third one of the high-frequency modules, an elevation angle estimation is made.

3. The method as recited in claim 1, wherein each of the transmitting subarrays is made up of one column or a plurality of parallel columns of antenna elements running vertically.

4. The method as recited in claim 1, wherein each of the receiving subarrays is made up of a plurality of parallel columns or sub-subarrays, which are positioned in two parallel rows running horizontally and are spaced uniformly with respect to each other within each of the rows.

5. The method as recited in claim 1, wherein the transmitting subarrays form a plurality of pairs, which are offset from each other, and with respect to the receiving subarrays in a vertical direction.

6. The method as recited in claim 5, wherein the transmitting subarrays of each of the pairs are at a same elevation in the vertical direction and are at a distance from each other in a horizontal direction, which is greater than widths of the transmitting subarrays together in the horizontal direction.

7. The method as recited in claim 1, wherein during a trip with the motor vehicle, in which the radar sensor is installed, when a single object is located at a particular azimuth angle, a transmitting directional diagram for the particular azimuth angle is recalibrated with the sub-method.

8. The method as recited in claim 1, wherein during operation of the motor vehicle, objects are located at different azimuth angles over time, a corrected or calibrated transmitting directional diagram is obtainable over time for an azimuth angle range.

9. A method for phase calibrating a multiple-input-multiple-output (MIMO) radar sensor for a motor vehicle, the method comprising:
at least one calibration routine, including the following:
prior to initial operation of the MIMO radar sensor, wherein the MIMO radar sensor includes an array having a plurality of antenna domains, each of the plurality of the antenna domains having subarrays of transmitting antennae, made from transmitting antenna elements, and receiving antennae, made from receiving antenna elements, which are offset from each other in at least one direction, and a plurality of high-frequency modules, each of which is assigned to one of the plurality of the antenna domains of the array, wherein the subarrays include transmitting subarrays and receiving subarrays, wherein one of the transmitting subarrays and one of the receiving subarrays is assigned to exactly one of the high-frequency modules, and wherein at least two transmitting subarrays, which are assigned to different ones of the high-frequency modules, are offset from each other in the at least one direction and are aligned with each other in a direction perpendicular to the at least one direction, performing the following:
storing a directional diagram, which assigns each of a plurality of angles a respective control vector, which includes a transmitting control vector and a receiving control vector, the transmitting control vector and the receiving control vector each including at least one component for each of the transmitting subarrays and receiving subarrays, respectively;
after initial operation, performing a sub-method by performing the following:
executing a radar measurement for tracking an object;
checking whether the tracked object is a single target or multiple targets; and
when the tracked object is a single target, performing the following:
carrying out a single-input-multiple-output (SIMO) measurement, using each of the transmitting subarrays;
estimating an angle of the tracked object using the SIMO measurement results;
computing a first comparison variable for each of the at least two transmitting subarrays, the first comparison variable being a function of the at least one component of the transmitting control vector;
computing a second comparison variable for each of the at least two transmitting subarrays, the second comparison variable being a function of the results of the SIMO measurements; and
correcting the transmitting control vector using a known relationship between the first comparison variable and the second comparison variable for the respective transmitting subarrays;
wherein the plurality of the antenna domains are situated on a circuit board,
wherein each of the plurality of the antenna domains, which is situated on the circuit board, includes one of the high-frequency modules, one of the transmitting subarrays, and one of the receiving subarrays, and
wherein the sub-method provides that interference effects, which are produced upon installation of the radar sensor in the motor vehicle and which are not measurable during a factory calibration, are subsequently compensatable.

10. The method as recited in claim 9, wherein the MIMO radar sensor includes at least three high-frequency modules, wherein the array is subdivided into the transmitting subarrays and the receiving subarrays so that at least two of the transmitting subarrays and receiving subarrays, which are assigned to a first one of the high-frequency modules and a second one of the high-frequency modules, respectively, are positioned so as to be horizontally offset from each other, and at least one further one of the transmitting subarrays and receiving subarrays, which is assigned to a third one of the high-frequency modules, is positioned so as to be vertically offset from the at least two of the transmitting subarrays and receiving subarrays, and wherein, for a phase calibration of the first one of the high-frequency modules and the second one of the high-frequency modules, an azimuth angle estimation is made, and a phase calibration of the third one of the high-frequency modules, an elevation angle estimation is made.

11. A multiple-input-multiple-output (MIMO) radar sensor for a motor vehicle, comprising:

an array made up of a plurality of transmitting and receiving antenna elements, which are offset from each other in at least one direction;
a plurality of high-frequency modules which are each assigned to a part of the array; and
an evaluation and control circuit for the high-frequency modules, wherein the evaluation and control circuit is configured to phase calibrate the MIMO radar sensor, wherein the array has a plurality of antenna domains, each of the plurality of the antenna domains being subdivided into transmitting subarrays and receiving subarrays so that one of the transmitting subarrays and one of the receiving subarrays is assigned to exactly one of the high-frequency modules, and wherein at least two of the receiving subarrays, which are assigned to different ones of the high-frequency modules, are offset from each other in the at least one direction and are aligned with each other in a direction perpendicular to the at least one direction, and wherein the evaluation and control circuit is configured to perform the following:
prior to initial operation of the radar sensor, performing a sub-method by performing the following:
storing a directional diagram, which assigns each of a plurality of angles a respective control vector, which includes a transmitting control vector and a receiving control vector, the transmitting control vector and the receiving control vector each including at least one component for each of the transmitting subarrays and receiving subarrays, respectively;
after initial operation, performing the following:
executing a radar measurement for tracking an object;
checking whether the tracked object is a single target or multiple targets; and
when the tracked object is a single target, performing the following:
carrying out a multiple-input-single-output (MISO) measurement, using each of the at least two receiving subarrays;
estimating an angle of the tracked object using MISO measurement results;
computing a first comparison variable for each of the at least two receiving subarrays, the first comparison variable being a function of the at least one component of the receiving control vector;
computing a second comparison variable for each of the at least two receiving subarrays, the second comparison variable being a function of results of the MISO measurements; and
correcting the receiving control vector using a known relationship between the first comparison variable and the second comparison variable for the respective receiving subarrays;
wherein the plurality of the antenna domains are situated on a circuit board,
wherein each of the plurality of the antenna domains, which is situated on the circuit board, includes one of the high-frequency modules, one of the transmitting subarrays, and one of the receiving subarrays, and
wherein the sub-method provides that interference effects, which are produced upon installation of the radar sensor in the motor vehicle and which are not measurable during a factory calibration, are subsequently compensatable.

12. A multiple-input-multiple-output (MIMO) radar sensor for a motor vehicle, comprising:
an array made up of a plurality of transmitting and receiving antenna elements, which are offset from each other in at least one direction;
a plurality of high-frequency modules which are each assigned to a part of the array; and
an evaluation and control circuit for the high-frequency modules, wherein the evaluation and control circuit is configured to phase calibrate the MIMO radar sensor, wherein the array has a plurality of antenna domains, each of the plurality of the antenna domains being subdivided into transmitting subarrays and receiving subarrays so that one of the transmitting subarrays and one of the receiving subarrays is assigned to exactly one of the high-frequency modules, and wherein at least two transmitting subarrays, which belong to different ones of the high-frequency modules, are offset from each other in the at least one direction and are aligned with each other in a direction perpendicular to the at least one direction, and wherein the evaluation and control circuit is configured to perform the following:
prior to initial operation of the radar sensor, performing a sub-method by performing the following:
storing a directional diagram, which assigns each of a plurality of angles a respective control vector, which includes a transmitting control vector and a receiving control vector, the transmitting control vector and the receiving control vector each including at least one component for each of the transmitting subarrays and receiving subarrays, respectively;
after initial operation, performing the following:
executing a radar measurement for tracking an object;
checking whether the tracked object is a single target or multiple targets; and
when the tracked object is a single target, performing the following:
carrying out a single-input-multiple-output (SIMO) measurement, using each of the transmitting subarrays;
estimating an angle of the tracked object using the SIMO measurement results;
computing a first comparison variable for each of the at least two transmitting subarrays, the first comparison variable being a function of the at least one component of the transmitting control vector;
computing a second comparison variable for each of the at least two transmitting subarrays, the second comparison variable being a function of the results of the SIMO measurements; and
correcting the transmitting control vector using a known relationship between the first comparison variable and the second comparison variable for the respective transmitting subarrays;
wherein the plurality of the antenna domains are situated on a circuit board,
wherein each of the plurality of the antenna domains, which is situated on the circuit board, includes one of the high-frequency modules, one of the transmitting subarrays, and one of the receiving subarrays, and
wherein the sub-method provides that interference effects, which are produced upon installation of the radar sensor in the motor vehicle and which are not measurable during a factory calibration, are subsequently compensatable.

* * * * *